(No Model.) 3 Sheets—Sheet 1.
W. J. STILL.
ELECTRIC MOTOR.

No. 517,669. Patented Apr. 3, 1894.

Witnesses. Inventor.

(No Model.) 3 Sheets—Sheet 2.

W. J. STILL.
ELECTRIC MOTOR.

No. 517,669. Patented Apr. 3, 1894.

Witnesses. Inventor:

(No Model.) 3 Sheets—Sheet 3.

W. J. STILL.
ELECTRIC MOTOR.

No. 517,669. Patented Apr. 3, 1894.

Witnesses. Inventor:

UNITED STATES PATENT OFFICE.

WILLIAM JOSEPH STILL, OF TORONTO, CANADA.

ELECTRIC MOTOR.

SPECIFICATION forming part of Letters Patent No. 517,669, dated April 3, 1894.

Application filed March 3, 1893. Serial No. 464,542. (No model.) Patented in Canada July 12, 1893, No. 43,578.

*To all whom it may concern:*

Be it known that I, WILLIAM JOSEPH STILL, electrician, of the city of Toronto, in the county of York, in the Province of Ontario, Canada, have invented certain new and useful Improvements in Electric Motors, of which the following is a specification.

This invention has been patented to me in Canada under No. 43,578, dated July 12, 1893. My invention relates to improvements in electro-magnetic motors and the objects of the invention are, first, to so construct the armatures and magnets of a magnetic motor that the greatest possible magnetic pull derived from their co-action may be utilized, without being materially affected during their demagnetization, so as to increase the power and speed of the machine; secondly, to so construct the brushes that the sparking now commonly incident to the rapidity of short circuiting may be entirely done away with and, thirdly, to provide an improved means whereby the eddy currents in the cores of the magnets may be reduced to a minimum and thereby facilitate an increased energy and speed of magnetic action of the magnets and it consists essentially, first, of providing in a suitable frame around the shaft of the motor arc-shaped magnets and further of providing an armature with arc-shaped end plates, the ends of which extend above and below the coils of the armature and the arc of which end plates is formed from a circle of greater radius than the circle in which the ends of the armatures are placed, the ends of the arc-shaped plates approaching very close to the circle in which the ends of the magnets are placed while the center is necessarily farther away from such circle; secondly, of forming the brushes of a central plate of conducting material of low resistance and locating on each side of the same plates of conducting material of high resistance, which are designed to co-act with the plates of the commutator in the manner hereinafter more particularly explained, and, thirdly, of forming the core of the magnets of a bundle of wires insulated from each other and preferably twisted as hereinafter more particularly explained.

Figure 1:
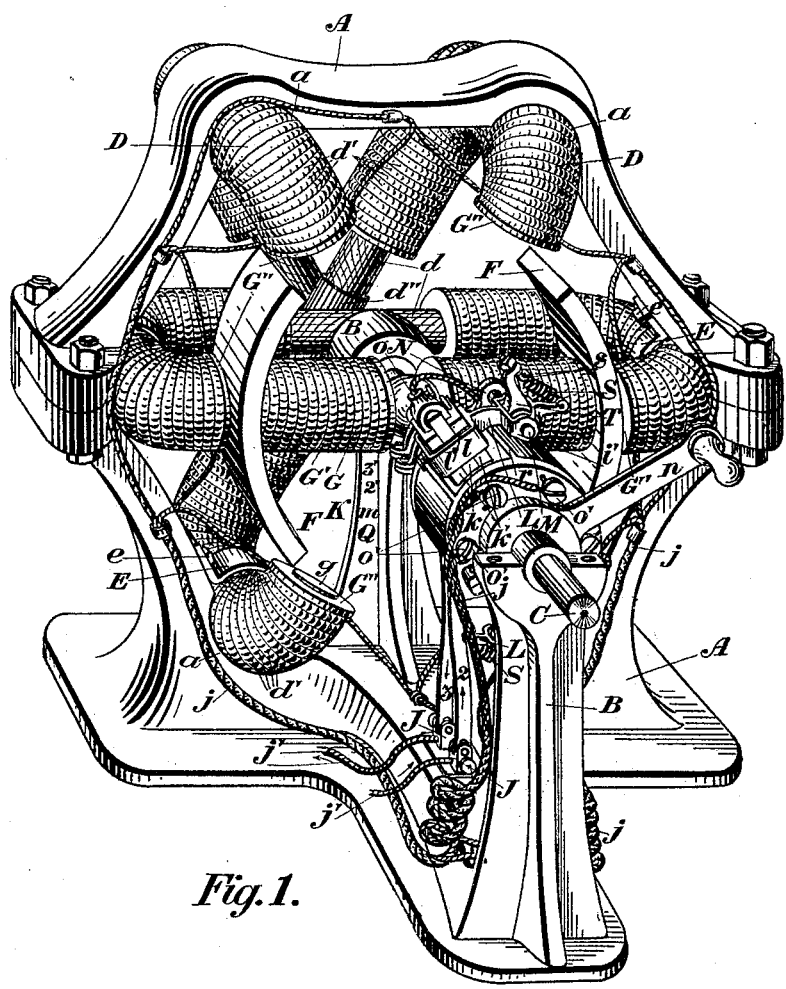
Figure 2:
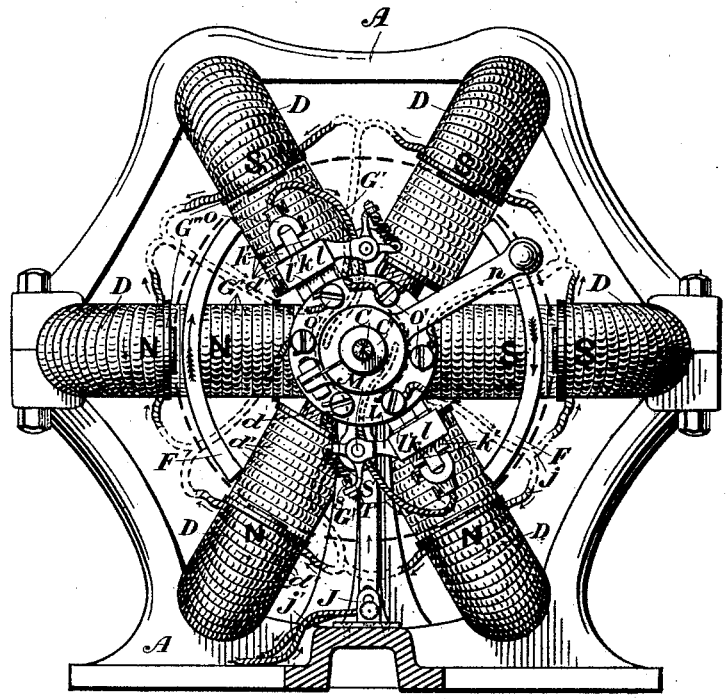
Figure 3:
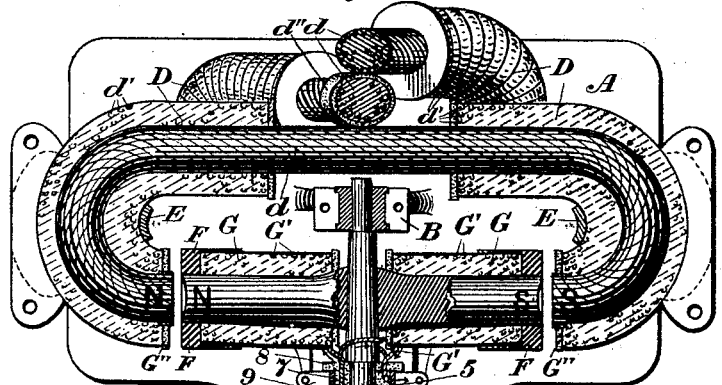
Figure 4:
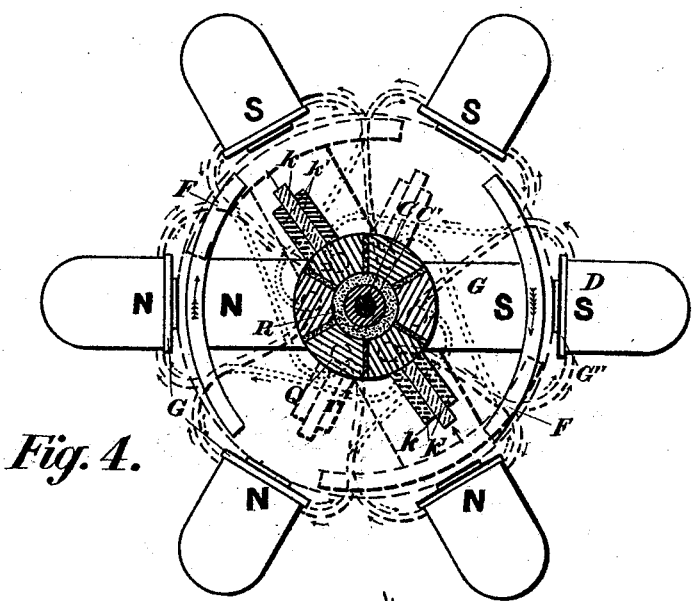
Figure 5:
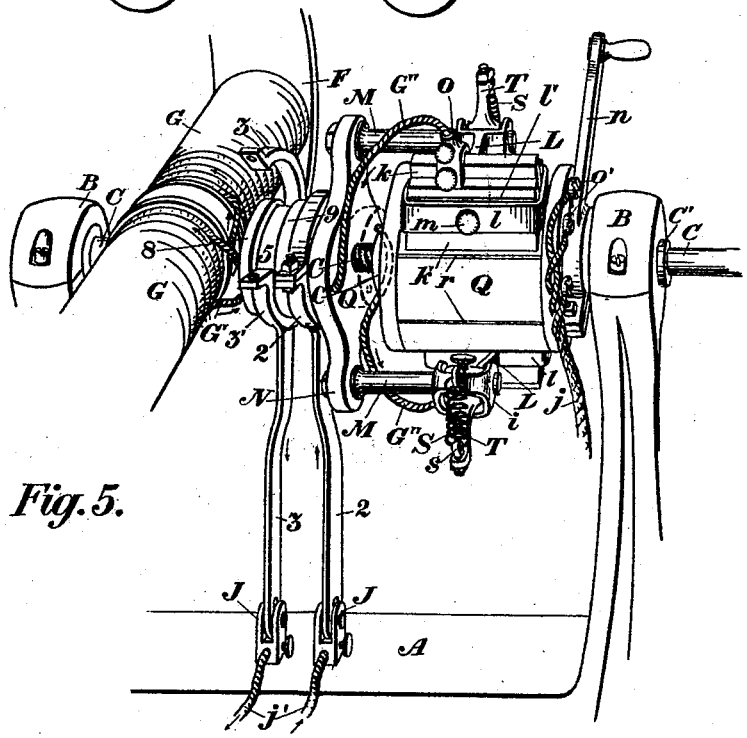

Figure 1, is a perspective view of my magnetic motor. Fig. 2, is an end elevation of my motor with the end standard removed. Fig. 3, is a sectional plan of my motor. Fig. 4, is a diagrammatic view showing the commutator and brushes in section, and the general arrangement and connection of the wires from the armature to the commutator. Fig. 5, is a detail of the manner in which the brushes are supported in position upon the commutator.

In the drawings like letters and numerals of reference indicate corresponding parts in each figure.

A, is the frame of the machine, B, the end standards in which the main shaft, C, is journaled.

D, are the magnets which extend behind the main driving shaft across from one side of the frame to the other, the central portion of the magnets being straight and the end portions arc-shaped as shown. The straight central portions of the three pairs of magnets extend one behind the other the ends of the magnets in each case only being wound while the cores abut each other, the centrally placed core being insulated from the outer and inner cores by an insulating collar, $d''$. The cores, $d$, of the magnets, D, are formed of a bundle of iron wires which are insulated from each other by means of their natural oxide or by electro-plating with metals of high magnetic resistance. The coils, $d'$, of the magnets are preferably formed with heavy wire, such coils extending from the straight portion of the cores of the magnet around the arc-shaped end as shown. The central portion of the cores of each magnet is preferably left without being wound. The magnets, D, are secured in the concave recesses $a$, in the frame, A, by the metal strips, E, which are bolted to the frame by bolts, $e$, as shown.

F, are curved metal plates secured to the end of the armatures, G, extending considerably above and below the coils, G'. The curve of the plates, F, from top to bottom is the arc of a circle greater in diameter than the circle in which the ends of the magnets are placed. The armatures have wound around them the armature coils G'. The end plates, F, of the armature are laterally parallel with the end plates of the magnets, D, and the end plates F, of the armature are so arranged that as the armature revolves they are still laterally parallel to the plates G″, of the magnets, D.

From what has been before described it will necessarily appear that as the curve upon which the plate, F, is constructed is the arc of a circle of greater diameter than the circle in which the ends of the magnets, D, are placed the end plates, F, of the armature as they pass the end plates of the magnets are farthest away from the magnets when the center of the plate, F, is opposite to the center of the magnet and as the plates pass the magnets they gradually approach to the magnet until the end of the plate F, is opposite to the magnet in which position the plate is nearest to the magnet (see Figs. 2, 3, and 4).

The core of the armature, G, is made of soft iron, the center of the core having a hole formed in it through which the shaft passes. The core is keyed on the shaft, so that it will rotate with it (see Fig. 3).

J, J, are binding bolts and, j′, j′, are the wires insulated in the usual manner which lead from the dynamo to the motor.

2 and 3 are upright bars connected to the binding post, J, and having the split ring upper ends, 2′, and, 3′, which are bolted together as shown around the rings, 4, and, 5. The rings, 4, and, 5, are secured on the collars, 6, and, 7, formed of insulated material.

8, is a collar secured at the inner end of the collar, 7, and, 9, is a collar secured between the rings, 4, and, 5.

K, K, are brushes which are secured in the open ends, l, l, of the holding levers, L, L, by the set screws, m, m, and are insulated from the open ends, l, l, by the plates, l′, l′. Each of the brushes is composed of three plates the central plate, k, being preferably of soft carbon or other conducting material of low resistance while the side plates, k′, are made of a piece of hard carbon or other conducting material of high resistance. The supporting levers, L, are pivoted on the ends of the spindles, M, which are secured in the arms, N, which are secured to or form part of the ring, O. The arms, N, and ring, O, are formed of insulating material and are secured on the shaft, C. The ring, O, with the outwardly extending arms, N, is secured on the main shaft C, but is held in position by the nuts, 10, shown by full lines in Fig. 3, and dotted lines in Fig. 5.

The commutator is constructed in the usual manner of metallic sections, Q, fitting into corresponding recesses in the insulating hub portion, R, the ends of which are formed of insulating material, the metallic sections being separated by the partition as shown in Figs. 3 and 4. The commutator is located on the sleeve, C′, which is held from rotating in the outer bearing or standard, B.

n, is a handle by which the position of the commutator is changed in relation to the brushes. The commutator is moved around by the handle, n. The changed position will be understood on reference to the heavy dotted lines leading to the commutator from the magnets and the light dotted lines leading from the same magnets (see Fig. 4). The brushes are held against the commutator in the ordinary manner by tension springs, S, which are connected at one end to the tail of the lever, L, and at the other end by an adjustable bolt, s, to the arm, T, secured on the end of the spindle, M, within the open end, i′, of the lever, L.

j, are wires leading from the binding posts, o′, of the sections Q, of the commutator to each of the magnets, D. The wire, j, runs through the coils of the magnets, D, as shown in Fig. 1. The wires, j lead from the binding post of the commutator to and through each of the magnets through two main insulated cables so that they are out of the way of the revolving armature and brushes but in Figs. 2 and 4 I show them running by dotted lines directly to the binding posts in order that the binding posts to which they run may be readily understood. This of course would not be so when the motor is built but they would be carried through the two insulated cables as shown in Fig. 1.

In reference to Figs. 2, 3, and, 5, the method of wiring the armatures from the brushes will be understood.

The coils of the core of the armature, G, are each wound from the wire, G′, which leads from the ring, 5, connected by the rod, 3, to to the binding post, J. The wire, G′, passes from the ring, 5, through the collars, 7, and, 8, where it divides one half passing to one end of the armature and the other half passing to the opposite end of the armature and the two halves returning from each end of the armature on the opposite sides of the shaft, C and then passing through the collars, 8, 7, 9, 6, ring, O, to the binding post, o, of the brush thence through the commutator and the magnets to the opposite brush whence the wire, G′, leads to the ring, 4, situated within the split ring, 2′, and down by the rod, 2, to the other binding post, J.

Having now described the principal parts involved in my invention I shall proceed to describe the operation and advantages arising from my construction of motor.

When the commutator is set in position indicated in Figs. 2, 4, and, 5, it will be seen that in the position in which the rotating brushes are shown in the drawings the current will pass through the commutator over the wires, j, which are shown partially in dotted lines in Figs. 2 and, 4, and in full lines in Fig. 1, from the binding post of the section opposite to the lower brush, K, outwardly along the wire, j, through the magnet, D, at the right hand side of the figures and through the magnets, D, shown at the top of the motor in the direction indicated by arrow back to the binding post of the section, Q, of the commutator opposite the upper brush making these three magnets of south polarity. The current also passes in the direction indicated by arrow through the magnets shown at the bottom left hand of the figures and back again to the binding post of the section, Q, of the commutator immediately beneath the rotating upper brush, K. It will be seen from what has been before described that the current through the brushes and armature is always in the same direction and consequently the polarity of the armature will remain unchanged. As the armature passes around the shaft in the direction indicated by arrow and the brushes rotating with it reach the next section of the commutator it will be seen that the current will pass outwardly over the wires, $j$, leading from the binding post of the next section of the commutator opposite the lower brush and will pass over the wires, $j$, through the three magnets to the right of this figure back to the binding post of the next section of the commutator at the top making the three magnets at the right of these figures south poles. The direction of the current being just the reverse as to the two magnets before which the armature is passing and passing back to the same section at the top the three magnets at the left hand side of the figure will be north poles. This changing of the polarity of the magnets will occur in rotation so that the armature will be caused to revolve in the direction indicated by arrow.

It will be seen that when the position of the commutator is changed to that indicated by the change of position of the heavy dotted lines to the position shown by the light dotted lines in Fig. 4, the brushes being opposite the changed position of the commutator and the armature as it rotates consequently being in the position shown by dotted lines in this figure such armature will be caused to rotate in the opposite direction to that indicated by arrow.

I shall now proceed to describe the means whereby the magnets are short circuited gradually and without any danger whatsoever of sparking. As the commutator remains stationary and the brush revolves around the commutator in the direction indicated by arrow it will be seen that the current passing through the lower brush into the metallic section, Q, of the commutator will pass over the wire, $j$, around the magnet at the right hand side of the figure and the two magnets at the top of the figure in the direction indicated by arrow making these magnets south pole magnets and come back to the opposite section over which the upper brush is for the time being. The current coming out over the same wire from the lower brush will pass through the magnets to the bottom of the figure and the magnets to the left hand side of the figure back to the section of the commutator over which the upper brush is for the time being making these three magnets north pole magnets. When the armature in revolving brings the lower end of the plate, F, opposite the pole of the lower magnet and the lower brush, K, has reached the partition, $r$, between the metallic sections Q, the circuit through the wires through the right hand magnets of Fig. 4, is gradually lessened by the side plate, $k'$, of high resistance and when the central plate of the brush bridges the partition, $r$, the current is altogether cut out from the wire, $j$, leading from this particular section, Q, over which the brush, K, is shown and the magnet, D, at the lower right hand side in Fig. 4, has the current cut out from it. During this period the end of the plate, F, is passing before the magnet, D, shown at the lower right hand side of this figure and is approaching the magnet at the lower left hand side of this figure. When the portion, $k'$, of the brush, K, behind the central plate, $k$, has reached the partition, $r$, it still connects the two adjacent metallic sections and the current still passes over them but gradually decreases until the plate, $k'$, has left the partition, $r$, when the current will pass in the opposite direction to that indicated by arrow through the magnet, D, at the lower right hand side of the figure and in the same direction through the magnet at the extreme right hand of the figure and the magnet at the upper right hand of the figure making these three magnets south poles, and the current passing out over the same wire from the metallic section of the commutator over which the brush is now for the time passing out through the magnet, D, at the lower left hand side of the figure, the magnet, D, at the extreme left hand of the figure in the same direction to that indicated by arrow and the magnet, D, at the upper left hand side of the figure in the opposite direction to that indicated by arrow thence inwardly to the opposite metallic section making the three poles at the right hand side of the figure north poles. It will consequently be seen that each succeeding magnet as the armature passes around in the direction indicated by arrow will be gradually demagnetized and the current will pass through it in the opposite direction so as to change its polarity. This action of the brush as to the commutator in short circuiting changes the direction of the current over the wire and from the magnets thereby the changing of the polarity of the magnet occurs as each armature is passing each magnet of the series. It will therefore be seen that on account of the peculiar formation of the brush consisting of the central plate of low resistance and the side plates of high resistance it will be impossible on account of the gradual lessening, short circuiting and gradual increase of the current to and from the magnet for any sparking of the brush to occur.

I shall now describe the peculiar advantages arising from the peculiar construction of the end plates of the armatures referring particularly to the diagrammatic view shown in Fig. 4. We will suppose as before stated that the armatures are caused in the manner before described to rotate in the direction indicated by arrow. The armature, G, in this figure is approaching the position in which the magnet is short circuited by the brush. The energy of the south polarity of the magnet will remain in a slight degree in the magnet as the armature, G, rotates past it. By the peculiar construction of the plate as before described drawn from a greater radius than the circle in which the ends of the magnets are situated it follows that as the outer ends of the plates almost touch such circle described there is a space left between the curve of the plate, F, and the arc of the circle in which the magnets are situated, which space gradually increases from the ends of the plate to its center. Consequently when the end of the armature reaches the magnet, D, and is short circuited as before described the energy derived from the north polarity now remaining in such magnet is neutralized as the plate of the armature is rotating until the center of the armature is directly opposite the center of the magnet and the magnet is acquiring its opposite polarity, that is to say the space being gradually increased between the plate of the armature and the magnet, D, the rotation of the armatures will not be affected as such gradually increasing space between the plate, F, of the armature, G, and the magnet, D, prevents the south polarity of the magnet having a reflex action on the plate of the armature, G, which it would have by reason of the slight amount of energy of south polarity which remains in the magnet.

It will now be seen in my motor that there will be no backward pull on the armature which is commonly the case in all motors of which I am aware. The plates, F, of course extend at equal distances below and above the magnet, D, so as to equalize the lines of force upon which the magnets act.

Another advantage derived from the peculiar construction of the plates, F, on the ends of the armatures as compared with other motors is that in other motors the magnets have to be short circuited before the most effective portion of the pull of the magnets is exercised upon the armatures while in my motor the pull of the magnet is utilized until the end plate of the armature comes close to the end of the magnet and the magnet is thus short circuited and demagnetized as the armature passes to a position opposite the center of the magnet. I have also an advantage that in the armatures and magnets I have got an attraction of the core for the core, coil for the coil, and core for the coil in both magnets and armatures.

I form the armature on a slight curve from the opposite end of one magnet to the opposite end of the other so that the armature would be in a direct path of the lines of force passing from one magnet to the other.

In this specification I describe the cores of the magnets as formed of a bundle of iron wires and the cores of the armatures as made of solid iron. It will of course be understood that the object of constructing the cores of the magnets with a bundle of fine wires is as before described to prevent the eddy currents in such cores but it will neither be advisable nor advantageous to construct the cores of the armatures of fine wires as it is only in the magnets that the current is reversed and the polarity changed.

Although I describe in this specification the core of the magnets composed of a bundle of twisted wires it will be seen that the bundle of wires might not be twisted but simply curved to correspond with the curve of the magnets but I find in practice that I produce better results by twisting the wires.

Again although I show the brush formed of one center section and two side sections it will be understood that in case the motor is designed to rotate in the one direction only the brush may be comprised of only one plate of conducting material of low resistance and one plate of conducting material of high resistance insulated from the holder, such conducting plate of high resistance being behind the conducting plate of low resistance as to the direction of rotation.

What I claim as my invention is—

1. In an electro-magnetic motor the combination with the field magnets having curved ends and the armature revolving between said curved ends, of curved plates carried by the ends of the revolving armature, substantially as described.

2. In an electro-magnetic motor, the combination with the field magnets composed of the elongated core bars having hooked ends with coils upon said ends, of the armature revolving between said hooked ends, substantially as described.

3. In an electro magnetic motor the field magnets composed of elongated core bars having hooked ends with coils upon said ends, and the armature revolving between said ends and adapted in its rotation to complete the loop of which the core bar and coils form the major part, substantially as described.

4. In an electro-magnetic motor the combination with the field magnets having hooked ends, of the armature revolving between said ends, and curved plates carried by the armature, lengthwise across the faces of the magnets the curve of the plates being described from a circle greater in diameter than the circle in which the ends of the magnets are placed so that the ends of the plates are nearer to the magnets and the central portion farther away from such magnets as the armature rotates as and for the purpose specified.

5. The combination with the series of field magnets having hooked ends and the armature rotating between said ends and designed to co-act with such magnets, one end of the coils of each armature being connected to one brush while the other end of the coils is connected to the other brush, both of which brushes are held in arms secured to a shaft and rotate with such shaft, of a stationary commutator designed to co-act with the brushes so as to supply the current to the magnets, short circuit such current and change its direction so as to change the polarity of the magnets as the armature rotates as and for the purpose specified.

6. The combination with the arc-shaped magnets, D, secured in the concave recesses, $a$, in the frame, A, by metal straps, E, and having the end plates constructed as specified, of the arc-shaped armature, G, having the plate, F, constructed as specified and secured to the hub, H, the said armature being constructed as specified and means whereby the current is conveyed into the coils of the armatures and magnets as and for the purpose specified.

7. The combination with the arc-shaped magnets, D, constructed as specified and having the core, $d$, formed of a bundle of twisted insulated wires and the armature, G, constructed as specified and having a soft solid iron core, $g$, as specified and means whereby the current is conveyed to the coils of the magnet and armatures as and for the purpose specified.

8. The combination with the armature and magnets constructed as specified and the wires running through the commutator to their corresponding magnets connected together in two series, of the rotating brushes, K, the lower one of which conveys the current passing through the armatures over the wires, $j$, to the brushes thence through the commutator to the magnets, the plates of the brushes being insulated from the holder and being formed of a central plate, $k$, of a conducting material of low resistance and the side plates, $k'$, of a conducting material of high resistance and the commutator being formed of insulated sections, Q, separated from each other by the partition, $r$, formed of insulating material as and for the purpose specified.

9. The combination with the armatures and magnets constructed as specified, of the rods, 2, and, 3, the split ring upper end of which surround the rings, 4, and, 5, respectively, of the insulated wires, G', leading from the ring, 5, to and through the armature and back through one brush, K, to the commutator thence through the magnets to the commutator and out by the other brush, wire, $j$, ring, 4, and rod, 2, as and for the purpose specified.

WILLIAM JOSEPH STILL.

Witnesses:
B. BOYD,
H. H. YOUNG.